(12) United States Patent
Malshe et al.

(10) Patent No.: US 11,797,441 B2
(45) Date of Patent: Oct. 24, 2023

(54) CACHE MEDIA MANAGEMENT

(71) Applicant: Micron Technology, Inc., Boise, ID (US)

(72) Inventors: Ashutosh Malshe, Fremont, CA (US); Sampath K. Ratnam, Boise, ID (US); Kishore Kumar Muchherla, Fremont, CA (US); Peter Feeley, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/103,419

(22) Filed: Nov. 24, 2020

(65) Prior Publication Data
US 2021/0216451 A1   Jul. 15, 2021

Related U.S. Application Data

(60) Provisional application No. 62/959,582, filed on Jan. 10, 2020.

(51) Int. Cl.
*G06F 12/08* (2016.01)
*G06F 12/0802* (2016.01)
*G06F 12/02* (2006.01)

(52) U.S. Cl.
CPC ...... *G06F 12/0802* (2013.01); *G06F 12/0253* (2013.01); *G06F 2212/7205* (2013.01)

(58) Field of Classification Search
None
See application file for complete search history.

(56) References Cited

U.S. PATENT DOCUMENTS

| | | | |
|---|---|---|---|
| 6,681,306 B1* | 1/2004 | Kessler | G06F 12/0276 707/999.202 |
| 9,093,160 B1* | 7/2015 | Ellis | G11C 16/32 |
| 9,747,202 B1 | 8/2017 | Shaharabany et al. | |
| 2012/0246204 A1 | 9/2012 | Nalla et al. | |
| 2013/0024609 A1* | 1/2013 | Gorobets | G06F 3/0611 711/103 |
| 2014/0258637 A1 | 9/2014 | Hong et al. | |
| 2016/0335179 A1* | 11/2016 | Lee | G06F 3/0614 |

(Continued)

FOREIGN PATENT DOCUMENTS

EP   1234238 B1   5/2007

OTHER PUBLICATIONS

PCT Notification of Transmittal of the International Search Report and the Written Opinion of the International Searching Authority for PCT Application No. PCT/US2021/012794, dated May 3, 2021, 10 pages.

*Primary Examiner* — Tracy C Chan
(74) *Attorney, Agent, or Firm* — Lowenstein Sandler LLP

(57) ABSTRACT

An exempt portion of a data cache of a memory sub-system is identified. The exempt portion includes a first set of data blocks comprising first data written by a host system to the data cache. A collected portion of the data cache of the memory sub-system is identified. The collected portion includes a second set of data blocks comprising second data written by the host system. A media management operation is performed on the collected portion of the data cache to relocate the second data to a storage area of the memory sub-system that is at a higher data density than the data cache, wherein the exempt portion of the data cache is exempt from the media management operation.

17 Claims, 7 Drawing Sheets

(56) References Cited

U.S. PATENT DOCUMENTS

| | | | |
|---|---|---|---|
| 2018/0232318 A1* | 8/2018 | Benhase | G06F 3/0608 |
| 2019/0196963 A1 | 6/2019 | Byun | |
| 2020/0133898 A1* | 4/2020 | Therene | G06N 3/0454 |
| 2022/0035738 A1* | 2/2022 | Brandt | G06F 13/4282 |

* cited by examiner

CACHE MEDIA MANAGEMENT

CROSS-REFERENCE TO RELATED APPLICATION

This application claims the benefit of U.S. Provisional Application No. 62/959,582, titled "Cache Media Management," filed Jan. 10, 2020, the entire disclosure of which is incorporated herein by reference.

TECHNICAL FIELD

Embodiments of the disclosure relate generally to memory sub-systems, and more specifically, relate to cache media management of a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
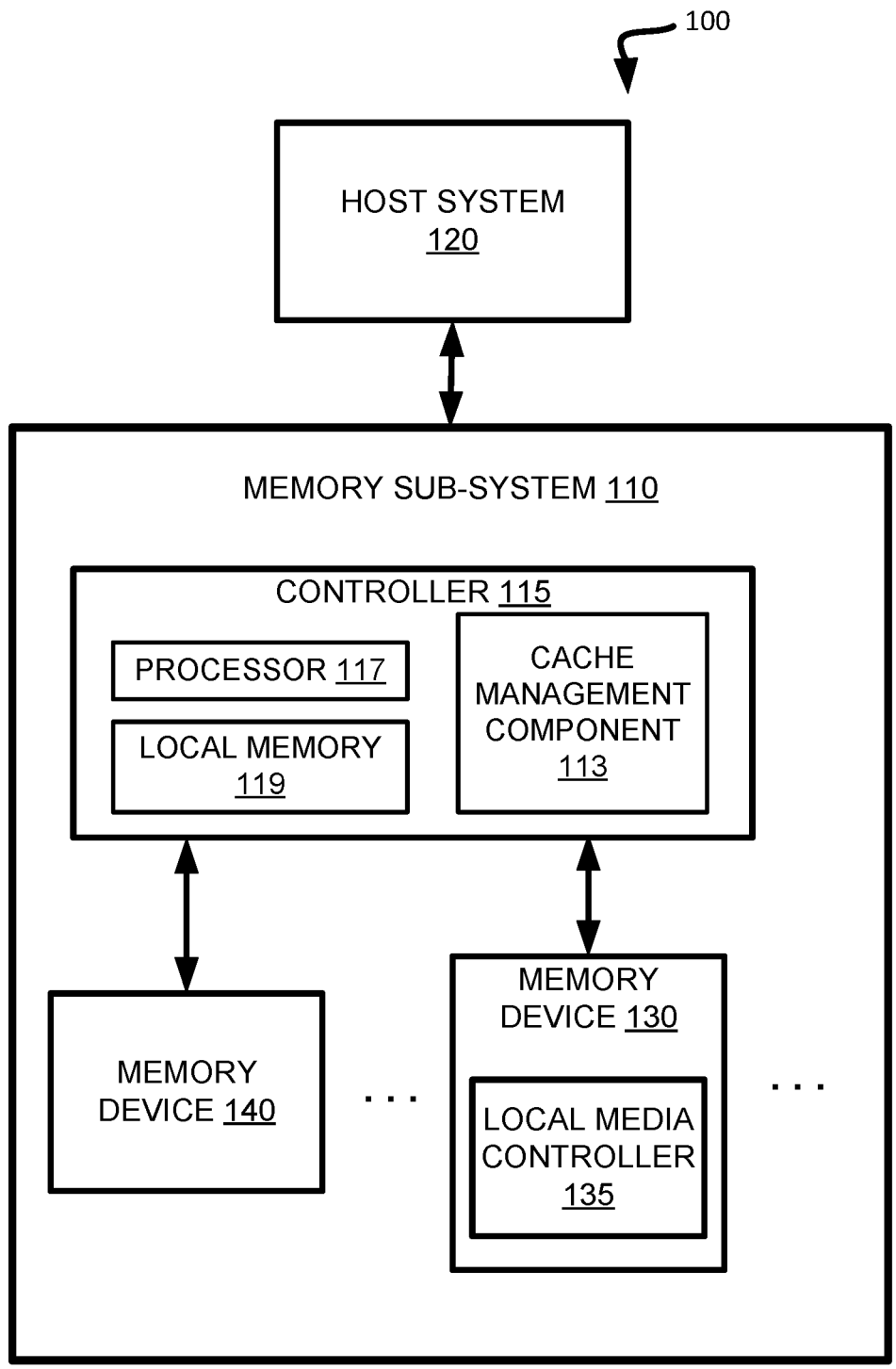
FIG. 1 illustrates an example computing system that includes a memory sub-system in accordance with some embodiments of the present disclosure.

Aspects of the present disclosure are directed to cache media management of a memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory device can be a non-volatile memory device. A non-volatile memory device is a package of one or more dice. Each die can consist of one or more planes. For some types of non-volatile memory devices (e.g., negative-and (NAND) devices), each plane consists of a set of physical blocks. Each block consists of a set of pages. Each page consists of a set of memory cells, which store bits of data. For some memory devices, such as NAND devices, blocks are the smallest area than can be erased and pages within the blocks cannot be erased individually. For such devices, erase operations are performed one block at a time.

A page of a block can contain valid data, invalid data, or no data. Invalid data is data that is marked as outdated as a new version of the data is stored on the memory device. Invalid data includes data that was previously written but is no longer associated with a valid logical address, such as a logical address referenced by a host system in a physical to logical (P2L) mapping table. Valid data is the most recent version of such data being stored on the memory device. A memory sub-system can mark data as invalid based on information received, for example, from an operating system. A page that does not contain data includes a page that has been previously erased, and not yet written to.

A memory sub-system controller can perform operations for media management algorithms, such as wear leveling, refresh, garbage collection, scrub, etc. A block may have some pages containing valid data and some pages containing invalid data. To avoid waiting for all of the pages in the block to have invalid data in order to erase and reuse the block, an algorithm hereinafter referred to as "garbage collection" can be invoked to allow the block to be erased and released as a free block for subsequent write operations. Garbage collection is a set of media management operations that include, for example, selecting a block that contains valid and invalid data, selecting pages in the block that contain valid data, copying the valid data to new locations (e.g., free pages in another block), marking the data in the previously selected pages as invalid, and erasing the selected block.

"Garbage collection" or "garbage collection operation" hereinafter refers to selecting a block, rewriting the valid data from the selected block to another block, and erasing all invalid data and valid data stored at the selected block. The valid data from multiple selected blocks can be copied to a smaller number of other blocks and the selected blocks can then be erased. As a result, the number of blocks that have been erased can be increased such that more blocks are available to store subsequent data from a host system.

The memory sub-system can include multiple memory devices having one or more arrays of memory cells such as low density storage having single level cells (SLCs) or high density storage having multi-level cells (MLCs), triple level cells (TLCs) or quad-level cells (QLCs). The host system can write data to a low density storage location (e.g., static SLC cache) of the memory sub-system which includes multiple reserved data blocks (e.g., having approximately a 6 GB cache size) typically configured to store host data on a first-in, first-out basis.

A memory sub-system can implement a garbage collection operation to maintain or generate a continuous supply of free data blocks to host applications for storing data. Garbage collection includes an operation to copy valid data from one data block to another data block. The source data block (e.g., the data block that the valid data is copied from) can then be erased and released as free block for subsequent host writes. This additional re-write of valid data in the data blocks during a garbage collection operation results in write amplification. Write amplification can reduce the operating life and impact performance of the memory sub-system. The memory sub-system can include some amount of additional blocks in excess of the logical size of the memory device that is exposed as user space. This additional memory space is typically referred to as over provisioning (OP). The efficiency of garbage collection operations can often be a function of the over provisioning for the memory sub-system. During garbage collection, additional space from over provisioning helps to reduce the write amplification. A larger amount of over provisioning can reduce the write amplification by reducing the number of times garbage collection re-writes valid data within the memory sub-system to free up data blocks.

Conventionally, during host idle time, a garbage collection operation can be performed to relocate all of the host data stored in the static SLC cache to high density bulk storage, referred to as an XLC (e.g., MLC/TLC/QLC) storage area (e.g., having a 256 GB storage size). The garbage collection operation includes a process of relocating data from one or more data blocks (e.g., the static SLC cache) into a new destination data block (e.g., the XLC storage), with the intended purpose of data consolidation to free up storage resources of the static SLC cache for subsequent erase and new write processing. During execution of the garbage collection operation, the host data can be copied from one or more NAND locations corresponding to the static SLC cache to another NAND location corresponding to the XLC storage. Generally, folding is performed to consolidate valid data together (e.g., garbage collection), freeing more space for new writes.

Relocating the valid host data from the static SLC cache to the XLC blocks results in write amplification on the XLC blocks. Write amplification (WA) can be represented by the multiplier of actual data written by the memory sub-system compared to the logical amount of write data sent to the memory sub-system by the host system.

Conventional memory sub-systems are configured to manage the static SLC cache by relocating or reclaiming the entire static SLC cache to the XLC blocks during host idle time. However, performing the garbage collection operation to relocate the entire static SLC cache during idle time to XLC blocks can hinder the performance of the memory sub-system and lower the endurance of the XLC memory to which the data is being rewritten. For example, garbage collection also involves additional writes by rewriting the data from the static SLC cache to the XLC storage area. Performing additional writes can lower bandwidth of the memory sub-system by consuming resources (e.g., processing and/or memory). Also, the more writes that are performed (e.g., write amplification) on a memory device, the faster the degradation of the memory device.

According to conventional memory sub-systems, garbage collection of host data that is repeatedly and frequently overwritten in a proximate time frame can result in the relocation of data to the high density storage area that is subsequently invalidated (e.g., overwritten data). Therefore, there is an unnecessary expense associated with the garbage collection of the data to the XLC blocks that is later invalidated (overwritten). Accordingly, garbage collection of the entire static SLC cache produces wasted garbage collection activities and the unnecessary expenditure of program/erase (P/E) cycles and increased endurance requirements.

Aspects of the present disclosure address the above and other deficiencies by exempting a portion of the static SLC data from the garbage collection process. The exempted portion of the SLC cache can include a portion of the most recently written data (e.g., newer data) of the SLC cache. In an embodiment, the exempt portion of the static SLC cache data can be identified by a sequence identifier or a version number associated with the data. In an embodiment, by exempting the newer SLC cache data from the garbage collection process, newer data that is more prone to overwriting by the host system can be maintained in the SLC cache, and not garbage collected for storage in the XLC storage area. A collected portion, or non-exempted portion, includes older data of the SLC cache that is subject to the garbage collection operation. According to an embodiment, the size of the exempt portion of the SLC cache can be fixed based on a calibration of over-write rate versus the SLC exempt portion size. In another embodiment, the exempt portion size can be determined and regulated dynamically based on changing workload conditions associated with the host system.

Advantageously, management of the garbage collection operation as described herein reduces media management (e.g., garbage collection) efforts associated with moving host data from the static SLC cache to the XLC blocks. The reduced media management effort (e.g., collection of the collected portion and not the exempt portion) according to embodiments of the present disclosure results in a reduction of the valid host data in SLC cache that is relocated to the XLC blocks, thereby reducing the XLC endurance requirements and improves the XLC write performance. Limiting the performance of the garbage collection operation to certain scenarios can improve the endurance of the memory device.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-systems 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components or devices), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fiber Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130,140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory devices such as NAND type memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations (e.g., in response to commands scheduled on a command bus by controller 116). The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device 117 (processor) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 and/or the memory device 140 as well as convert responses associated with the memory devices 130 and/or the memory device 140 into information for the host system 120.

In some implementations, memory sub-system 110 can use a striping scheme, according to which every the data payload (e.g., user data) utilizes multiple dies of the memory devices 130 (e.g., NAND type flash memory devices), such that the payload is distributed through a subset of dies, while the remaining one or more dies are used to store the error correction information (e.g., parity bits). Accordingly, a set of blocks distributed across a set of dies of a memory device using a striping scheme is referred herein to as a "superblock."

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 includes a cache management component 113 that can execute media management operations, for example, garbage collection operations, with respect to a first portion of the data of the static SLC cache (i.e., a collected portion), while a second portion of the data of the static SLC cache is exempt from the media management (e.g., garbage collection) (i.e., an exempt portion). In some embodiments, the controller 115 includes at least a portion of the cache management component 113. For example, the controller 115 can include a processor 117 (processing device) configured to execute instructions stored in local memory 119 for performing the operations described herein. In some embodiments, the cache management component 113 is part of the host system 120, an application, or an operating system.

The cache management component 113 can identify a first portion of a first-in, first-out SLC cache as a portion subject to a media management operation (e.g., garbage collection operation). A garbage collection operation is described hereinafter as one example of a media management operation. The cache management component 113 further identifies a second portion of the SLC cache that is exempt from the garbage collection operation. The first portion (i.e., the "collected portion") includes the older data of the SLC cache. The second portion (i.e., the "exempt portion") includes the newer data of the SLC cache that is not subject to the garbage collection operation. Exempting the relatively newer data of the SLC cache (e.g., data more recently sent by the host system to the SLC cache storage as identified by a corresponding sequence identifier or version number) from the garbage collection operation avoids the unnecessary relocation of host data to the XLC storage as newer data can have a higher probability of being overwritten by the host system in a subsequent proximate period of time.

Delaying the garbage collection of the most recently written host data stored in the exempt portion results in the amount of valid data garbage collected to the XLC blocks to be reduced. The cache management component 113 executes the garbage collection operation with respect to a smaller set of data (i.e., the collected portion) of the SLC cache, thereby reducing XLC endurance requirements.

Further, in an embodiment, the cache management component 113 can dynamically determine a size of the exempt portion. For example, the cache management component 113 can adjust the exempt portion size of the SLC cache based on one or more parameters or metrics associated with the memory sub-system 110 (e.g., workload metrics associated with the host system).

Figure 2:
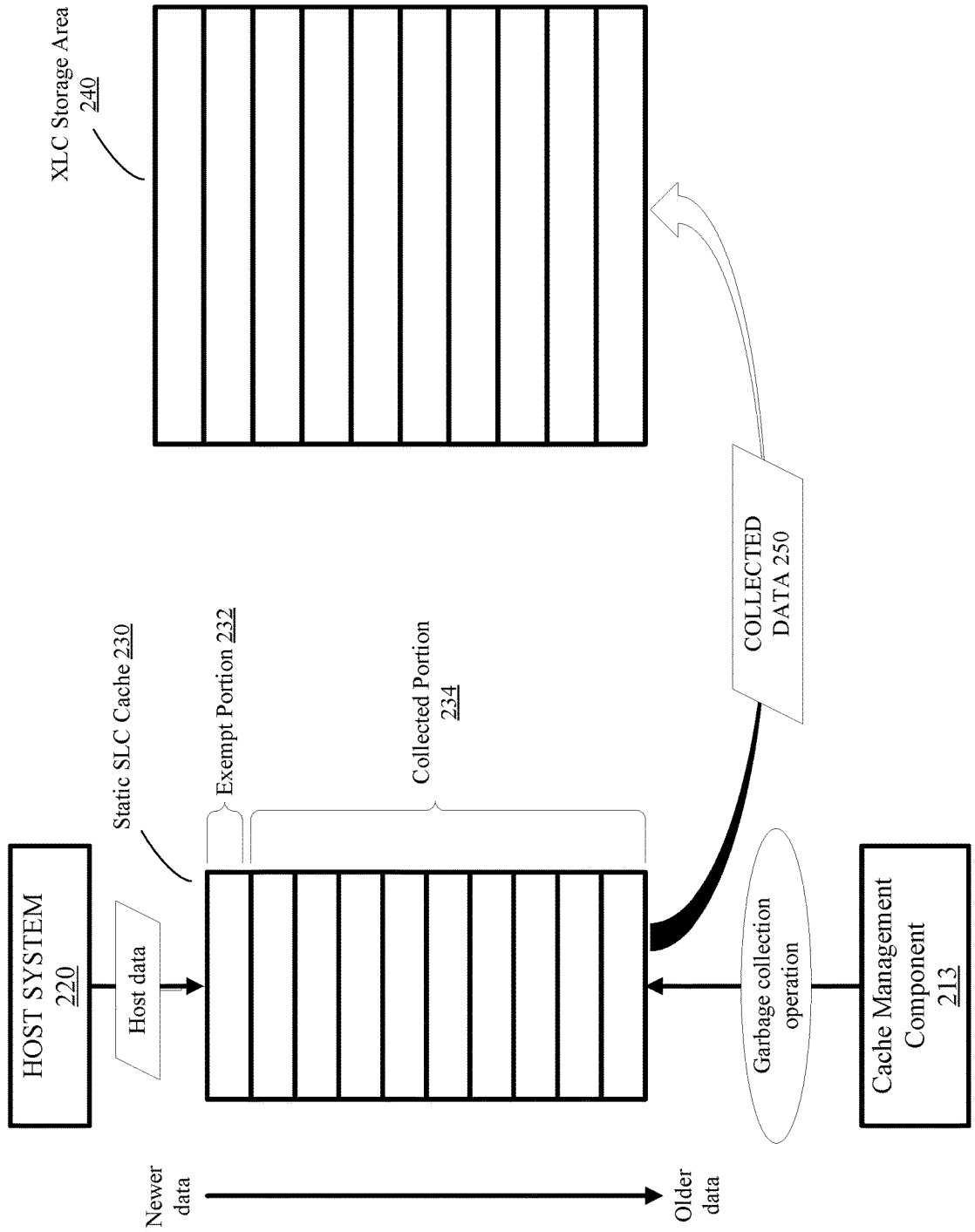
FIG. 2 illustrates an example cache management component controlling media management operations associated with a memory sub-system in accordance with some embodiments of the present disclosure.

FIG. 2 illustrates an example cache management component 213 controlling garbage collection operations associated with a static SLC cache 230 of a memory sub-system in accordance with some embodiments of the present disclosure. As shown in FIG. 2, a host system 220 writes host data to the static SLC cache 230 for storage in the associated data blocks. In an embodiment, the garbage collection operations are performed in the background to collect or relocate host data from the static SLC cache 230 to an XLC storage area 240 during host idle time. In an embodiment, an idle state of the host system can be identified if a period of time of inactivity (e.g., no read or write activity by the host system 220) is reached.

In an embodiment, as shown in FIG. 2, the static SLC cache 230 is configured in a first-in/first-out arrangement where newer host data is stored in a first set of one or more designated blocks (e.g., the topmost block(s) as shown in FIG. 2). In an embodiment, each write from the host system 220 is associated with information identifying a relative time of the corresponding write operation. For example, each write operation can be identified by a sequence identifier or version number. Each successive write operation can be identified by an incremented sequence identifier or version number. In an embodiment, the host data stored in the static SLC cache 230 can have an associated time (e.g., the time when the respective host data has been written to the static SLC cache), such that more recently written static SLC data can be identified.

In an embodiment, the cache management component 213 executes a garbage collection operation that is to collect data from a first portion of the static SLC cache 230 (the collected portion 234), while exempting a second portion of the static SLC cache 230 (the exempt portion 232) from the garbage collection process. In the embodiment shown in FIG. 2, the portion of the static SLC cache 230 that is exempted from the garbage collection process has a fixed size and includes one or more blocks of the SLC cache 230 designated to store the most recently written static SLC data (e.g., a portion of the newer data), and is referred to as the exempt portion 232. In an embodiment, the size of the exempt portion 232 can be defined by a storage amount (e.g., 512 MB, 1 GB, etc.), a number of blocks of the SLC cache 230 (e.g., two blocks, two and a half blocks, three blocks, etc.), a percentage of a total size of the SLC cache 230, or other metrics.

As shown in FIG. 2, execution of the garbage collection operation by the cache management component 213 results in the garbage collection of data from the collected portion 234 of the static SLC cache 230. The collected data 250 is relocated to the XLC storage area 240, while the data stored in the exempt portion 232 is maintained in the static SLC cache 230. In an embodiment, host data subject to overwriting by the host system 220 in a proximate period of time is preserved in the static SLC cache 230. Delaying the garbage collection of this most recently written host data (e.g., to collection during a subsequent garbage collection operation) reduces or minimizes the garbage collection of valid data to the XLC storage area 240. Advantageously, the reduced garbage collection executed by the cache management component 213 results in reduced XLC storage area endurance requirements.

In an embodiment, a size of the fixed exemption portion 232 is selected to optimize the size of the collected portion 234 in view of an amount of host data overwritten in the static SLC cache and the write amplification of the XLC storage area.

Figure 3:
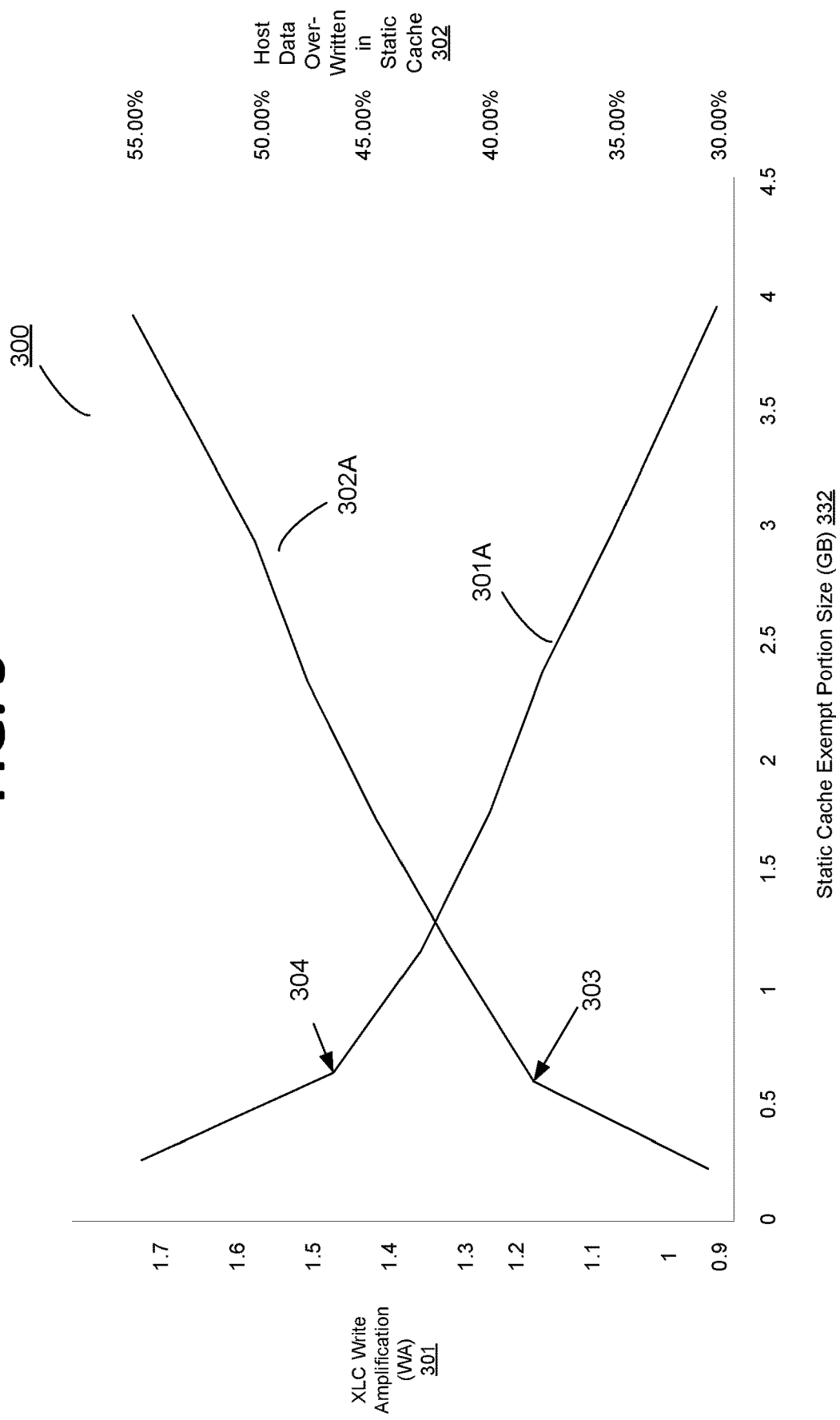
FIG. 3 is a graph illustrates example data relating to write amplification and percentages of host data overwritten in a data cache as a function of a size of an exempt portion size of the data cache in accordance with some embodiments of the present disclosure.

FIG. 3 is a graph 300 that illustrates example data of the XLC write amplification 301 and percentages of host data overwritten in a static SLC cache 302 as a function of a size of an exempt portion of the static SLC cache 332 in accordance with some embodiments of the present disclosure. In an embodiment, a fixed exempt portion size can be optimized in view of an amount of collected data (e.g., collected data 250 from the collected portion 234 of FIG. 2) that is desired to enable a sufficient level of the SLC cache to be available or freed following the garbage collection operation in advance of subsequent host write activity. In an embodiment, the exempt portion 232 size can represent a relatively small portion of the static SLC cache that is not subject to the garbage collection operation while having a suitable collected portion 234 size capable of storing data for subsequent write operations from the host system. Advantageously, establishing the exempt portion 232 enables 20% to 30% reduction in XLC endurance requirements.

In an embodiment, a size of the fixed exempt portion (e.g., exempt portion 232 of FIG. 2) can be selected based on an optimization of the XLC write amplification 301 as a function of the static cache exempt portion size (represented by line 301A in FIG. 3) and the amount of host data overwritten in the static SLC cache 302 as a function of the static cache exempt portion size (represented by line 302A in FIG. 3), in view of setting a sufficient amount of the collected portion of the SLC cache to free up space for data of a next group of write operations. For example, as shown in graph 300, at a static cache exempt portion size of 512 MB, approximately 40% of the host data is identified as over-written in static cache (as denoted by point 303) at a write amplification level of approximately 1.45 (as denoted by point 304).

In this example, setting the size of the exempt portion 232 in FIG. 2 results in the relocation of approximately 60% of the terabytes written (TBW) of the host system to XLC storage area 240 as a result of the garbage collection operation. As shown in FIG. 3, the setting of a larger static cache exempt portion size produces larger percentages of host data over-written in the static SLC cache and smaller XLC WA, which results in a smaller XLC endurance requirement.

In an example, establishing a fixed static cache exempt portion size of 512 MB, the XLC WA exhibits a decrease from 1.74 to 1.45 (e.g., approximately an 18% reduction in XLC endurance budget). In another example, establishing a fixed static cache exempt portion size of 1 GB, the XLC WA reduces to 1.3, resulting in approximately a 25% XLC endurance savings. exhibits a decrease from 1.74 to 1.45 (e.g., approximately an 18% reduction in XLC endurance budget)

Figure 4:
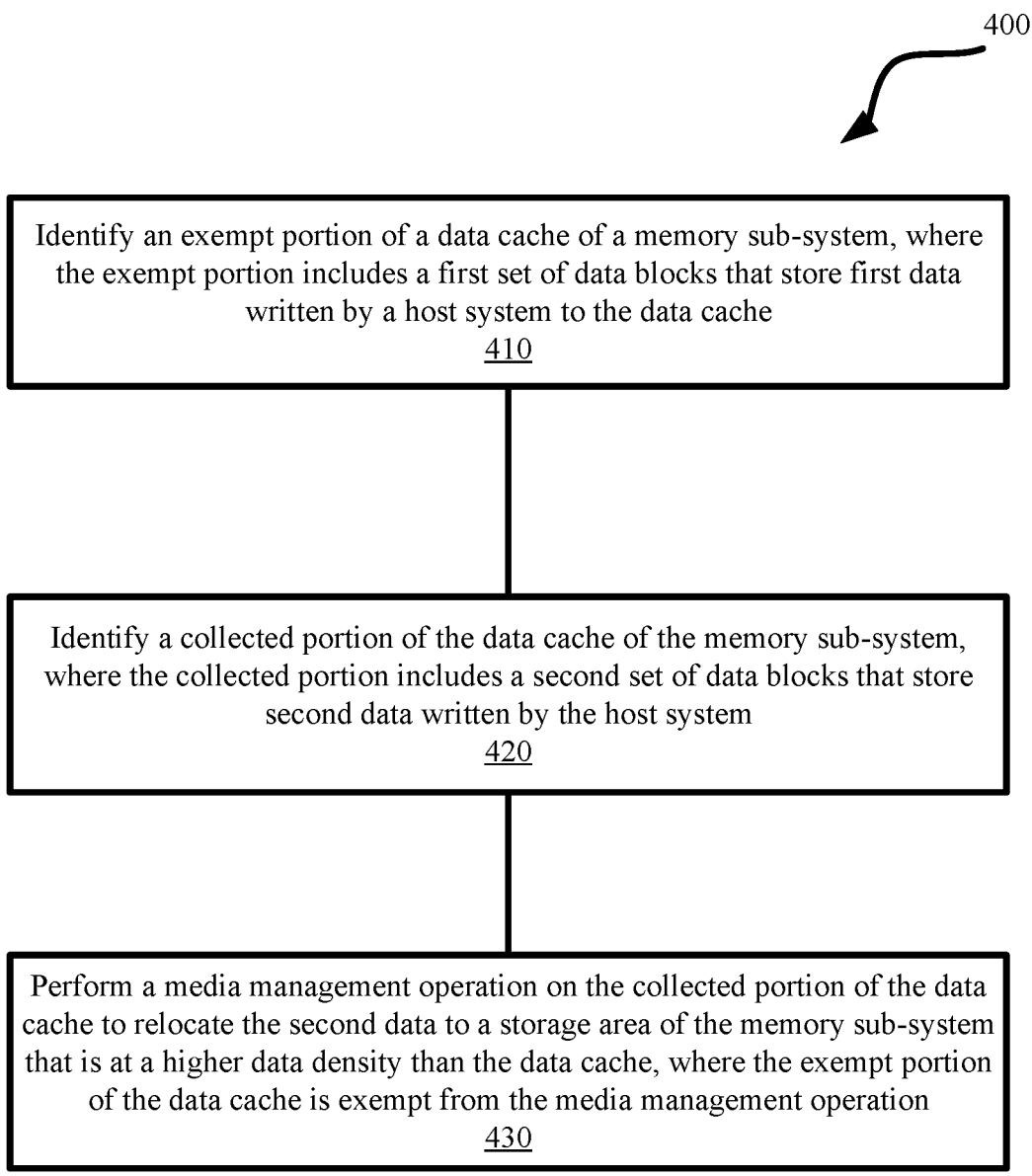
FIG. 4 is a flow diagram of another example method to manage a media management operation relating to a data cache of a memory sub-system in accordance with some embodiments of the present disclosure.

FIG. 4 is a flow diagram of an example method 400 to identify a first portion of data blocks in a cache of a memory sub-system to be exempt from a garbage collection operation performed on a remaining portion of the cache in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the cache management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, the processing device identifies an exempt portion of a data cache of a memory sub-system, where the exempt portion includes a first set of data blocks that store first data written by a host system to the data cache. In an embodiment, the data cache is a low density storage area such as a static SLC data cache. The first data stored in the identified exempt portion of the data cache includes relatively newer data written by the host system to the SLC data cache. In an embodiment, the exempt portion of the data cache has a fixed size (e.g., a 512 MB portion of a 6 GB data cache). In an embodiment, the size of the exempt portion can be set in terms of a number of blocks of the data cache, a predetermined size, a predetermined percentage of a total size of the data cache, etc. In an embodiment, the identified exempt portion of the data cache is the exempt portion 232 of FIG. 2.

In operation 420, the processing device identifies a collected portion of the data cache of the memory sub-system, where the collected portion includes a second set of data blocks that store second data written by the host system. In an embodiment, the second data stored in the collected portion of the data cache includes relatively older data written by the host system to the SLC data cache (e.g., the first data is written by the host system to the SLC cache more recently than the second data). In an embodiment, the collected portion of the data cache is the collected portion 234 of FIG. 2.

In operation 430, the processing device performs a media management operation on the collected portion of the data cache to relocate the second data to a high data density storage area (e.g., an XCL storage area, such as a MLC/ TLC/QLC storage area), where the exempt portion of the data cache is exempt from the garbage collection operation. For example, the media management operation can be a garbage collection operation. In an embodiment, exemption of the exempt portion of the data cache from the media management operation (e.g., the garbage collection operation) results in the relatively newer data of the data cache (e.g., the data more recently written by the host system to the data cache) to remain or be maintained in the data cache. Advantageously, this newer or more recently written data left in the data cache represents data more likely to be overwritten by the host system. In an embodiment, the media management operation can be performed during an idle time associated with the host system. In an embodiment, following the performance of the media management operation, responsive to subsequent write activity by the host system generating "newer" host data, the first data can be allocated to one or more data blocks of the collected portion, where that data is subject to a subsequent garbage collection operation.

Figure 5:
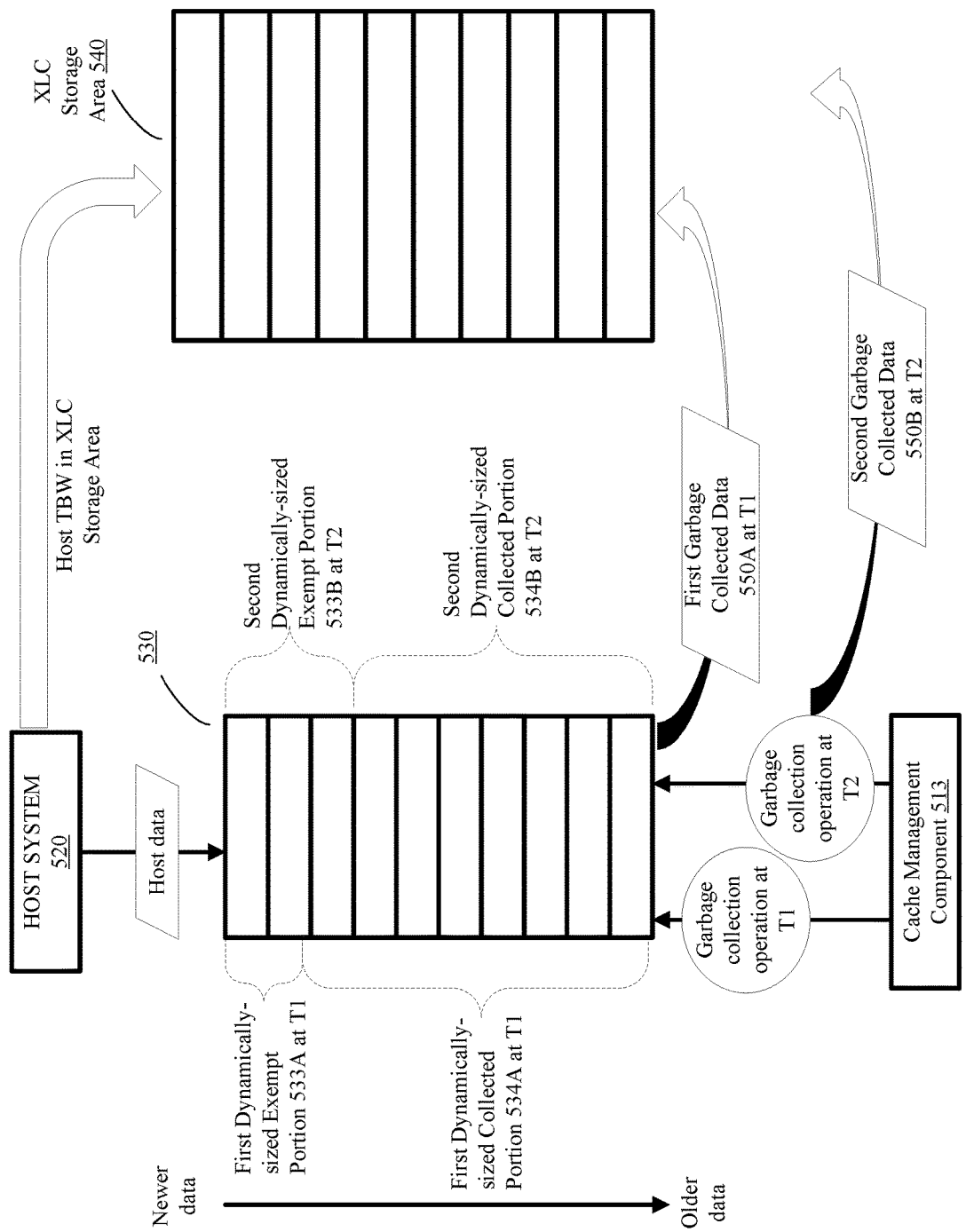
FIG. 5 illustrates an example cache management component controlling media management operations associated with a memory sub-system in accordance with some embodiments of the present disclosure.

FIG. 5 illustrates an example cache management component 513 controlling garbage collection operations associated with a static SLC cache 530 of a memory sub-system, where the static SLC cache 530 includes a dynamic exemption portion size in accordance with some embodiments of the present disclosure. As shown in FIG. 5, a host system 520 writes host data to the static SLC cache 530 for storage in the associated data blocks. In an embodiment, the garbage collection operations are performed in the background to collect or relocate host data from the static SLC cache 530 to a XLC storage area 540 during host idle time. In an embodiment, an idle state of the host system can be identified if a period of time of inactivity (e.g., no read or write activity by the host system 520) is reached.

In an embodiment, as shown in FIG. 5, the static SLC cache 530 is configured in a first-in/first-out arrangement where newer host data is stored in a first set of one or more designated blocks (e.g., the topmost block(s) as shown in FIG. 5). In an embodiment, each write from the host system 520 is associated with information identifying a relative time of the corresponding write operation. For example, each write operation can be identified by a sequence identifier or version number. In an embodiment, the host data stored in the static SLC cache 530 can have an associated time, such that more recently written static SLC data can be identified.

In an embodiment, the cache management component 513 executes a garbage collection operation configured to collect data from a first portion of the static SLC cache 230 (the collected portion 534A, 534B), while exempting a second portion of the static SLC cache 530 (the dynamic exempt portion 533A, 533B) from the garbage collection process.

In the embodiment shown in FIG. 5, a size of the portion of the static SLC cache 530 that is exempted from the garbage collection process is dynamically regulated or adjusted. In one example, the size of the exempted portion 530 is adjusted or set as a function of one or metrics or measured levels of the memory sub-system. In one example, the size of the exempted portion 530 is adjusted or set as a function of a workload level associated with the host system 520. In an embodiment, the dynamic exempt portion 533A, 533B is regulated based on the workload metrics of the host system 520 to maximize the benefit of reduced XLC WA and endurance requirements. In an embodiment, a baseline or default size value can be established for the dynamically-sized exempt portion 533A, 533B and dynamically adjusted based on one or more measurements or metrics (e.g., a host workload metric) monitored and collected by the cache management component 513. Example host workload metrics include, but are not limited to, a host burst size (e.g., an amount of host data written in bursts between host idle events), an amount of valid data garbage collected into the XLC storage area 540, and an amount of host data (TWB) directly written to the XLC storage area 540 (e.g., for memory sub-systems that support direct XLC write paths). In an embodiment, the baseline size value for the second dynamically-sized exempt portion 533B can be the size of the first dynamically-sized exempt portion 533A.

In an embodiment, a size of the dynamic exempt portion 533A, 533B can be calculated according to the following expression:

Exempt portion size=Function (one or more of a host burst size, valid data garbage collected to the XLC storage area, host TBW in the XLC storage area, etc.).

In an embodiment, the dynamic exempt portion has a dynamically controlled or adjusted size that includes one or more blocks of the SLC cache 230 designated to store the most recently written static SLC data (e.g., a portion of the newer data). As shown in FIG. 5, the cache management component 513 can determine a first dynamically-sized exempt portion 533A at a first time (T1) in connection with a first garbage collection operation at T1. In an embodiment, the dynamically-sized exempt portion 533A can include the one or more data blocks beginning from the topmost data block of the SLC cache 530 (corresponding to the newest host data) and ending at a point corresponding to the dynamically-sized exempt portion size. In the example shown in FIG. 5, the dynamically-sized exempt portion 533A at T1 corresponds to the two topmost blocks of the SLC cache 530. The remaining portion of the SLC data cache 530 (e.g., the remaining eight blocks) represents the dynamically-sized collected portion 534A at T1.

As shown in FIG. 5, at T1, a first dynamically-sized exempt portion 533A and a first dynamically-sized collected portion 534A are determined. In an embodiment, the size of the dynamically-sized exempt portion 533A, 533B can be defined in terms of a storage size or amount (e.g., 512 MB, 1 GB, etc.), a number of blocks of the SLC cache 530 (e.g., two blocks, two and a half blocks, three blocks, etc.), a percentage of a total storage size of the SLC cache 530 (e.g., 20% of the total cache size), or other metric.

As shown in FIG. 5, execution of the first garbage collection operation by the cache management component 513 results in the garbage collection of the data stored in the first dynamically-sized collected portion 534A of the static SLC cache 530. The first garbage collected data 550A is relocated to the XLC storage area 540, while the data stored in the first dynamically-sized exempt portion 533A is maintained in the static SLC cache 230 at T1. As a result of maintaining the first dynamically-sized exempt portion 533A in the data cache 530 at T1, host data more likely to be subject to overwriting by the host system 520 in a subsequent proximate period of time is preserved in the static SLC cache 530. Delaying the garbage collection of this most recently written host data reduces or minimizes the garbage collection of valid data to the XLC storage area 540.

In an embodiment, in connection with a subsequent or second garbage collection operation at a second time (T2), a second dynamically-sized exempt portion 533B and a second dynamically-sized collected portion 534B are determined. In an embodiment, as described above, a size of the second dynamically-sized exempt portion 533B is determined based at least in part on one or more workload metrics associated with the host system 520. For example, in a period between T1 and T2, the cache management component 513 can determine that the host system 520 had a decreased host burst size (e.g., a first workload metric) as compared to a period before T1. In this example, based on the identified workload metric, the cache management component 513 can increase the size of second dynamically-sized exempt portion 533B as compared to the size of first dynamically-sized exempt portion 533A. In an embodiment, the cache management component 513 executes a second garbage collection operation at T2 resulting in the relocation of the second garbage collection data 550B to the XLC storage area 540. In an embodiment, the data stored in the second dynamically-sized exempt portion 533B is exempt from the second garbage collection operation executed at T2, and as such, that data is maintained in the data cache 530.

In an embodiment, the cache management component 513 adjusts the second dynamically-sized exempt portion 533B and the second dynamically-sized collected portion 533B relative to the first dynamically-sized exempt portion 533A and the second dynamically-sized collected portion 533A, in view of updated workload metrics associated with the host system, respectively. In an embodiment, the cache management component 513 dynamically-sized exemption portion 533A, 533B is selected to optimize the size of the collected portion 234 in view of an amount of host data overwritten in the static SLC cache and the write amplification of the XLC storage area.

Figure 6:
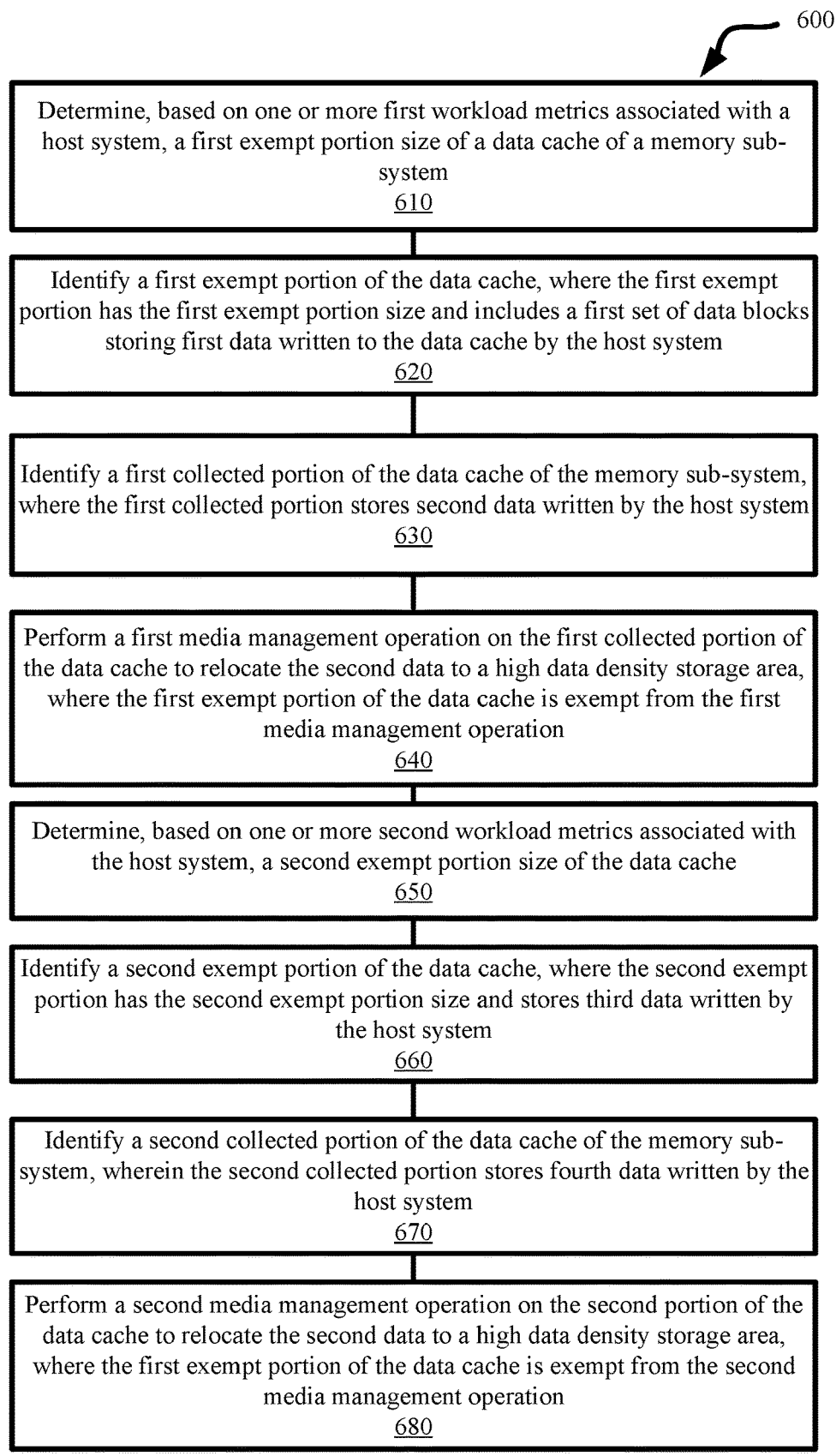
FIG. 6 is a flow diagram of another example method to manage media management operations relating to a data cache of a memory sub-system in accordance with some embodiments of the present disclosure.

FIG. 6 is a flow diagram of another example method 600 to manage media management operations (e.g., garbage collection operations) to relocate data stored in a static SLC data cache to a higher density data storage area (e.g., an XLC storage area), where the static SLC cache includes a dynamically-sized exemption portion and a dynamically-sized collected portion identified in accordance with some embodiments of the present disclosure. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by the cache management component 113 of FIG. 1 or the cache management component 513 of FIG. 5. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 610, the processing device determines, based on one or more first workload metrics associated with a host system, a first exempt portion size of a data cache of a memory sub-system. In an embodiment, the one or more first workload metrics can include a host burst size (i.e., amount of host data written in bursts in a period between host idle events), an amount of valid data that has been garbage collected into the high data density area (e.g., the XLC storage area 540 of FIG. 2) during one or more previous media management operations (e.g., garbage collection operations), and an amount of host data directly written to the high data density area (e.g., as shown by the direct writing of host TBW to the XLC storage area 540 in FIG. 5). In an embodiment, the first portion size can be set by adjusting a baseline or default size value up or down as a function of the one or more first workload metrics. In an embodiment, the first exempt portion size can be any suitable size to optimize the write amplification of the XLC storage area and an amount of data in the data cache that is overwritten. For example, for a 6 GB data cache, the first portion size can be approximately 512 MB.

At operation 620, the processing device identifies a first exempt portion of the data cache, where the first exempt portion has the first exempt portion size and includes a first set of data blocks storing first data written to the data cache by the host system. In an embodiment, the first exempt portion corresponds to first dynamically-sized exempt portion 533A in FIG. 5.

At operation 630, the processing device identifies a first collected portion of the data cache of the memory sub-system, where the first collected portion stores second data written by the host system. In an embodiment, a sum of the first exempt portion size and a size of the first collected portion equals a total size of the data cache. Accordingly, the first collected portion corresponds to the remaining portion of the data cache, after having identified the first exempt portion. In an embodiment, the first collected portion corresponds to the first dynamically-sized collected portion 534A in FIG. 5, since a size of the first collected portion varies based on the dynamically determined first exempt portion size.

At operation 640, the processing device performs a first media management operation on the first collected portion of the data cache to relocate the second data to a high data density storage area, where the first exempt portion of the data cache is exempt from the first media management operation. In an embodiment, the first data stored in the first exempt portion is not relocated to the XLC storage area, but instead is maintained in the data cache. In an embodiment, the first media management operation (e.g., garbage collection operation) corresponds to the garbage collection operation performed at T1 in FIG. 5. In an embodiment, the second data (relocated to the XLC storage area 540 as a result of the garbage collection operation) corresponds to the first garbage collected data 550A of FIG. 5. In an embodiment, the first media management operations (e.g., garbage collection operations) is performed in response to identifying an idle event associated with the host system.

At operation 650, the processing device determines, based on one or more second workload metrics associated with the host system, a second exempt portion size of the data cache. In an embodiment, one or more workload metrics associated with the host system can change during a period of activity by the host system. In an embodiment, in response to an idle event associated with the host system, the processing device can determine the updated or new workload metrics (e.g., the one or more second workload metrics) for use in dynamically sizing the exempt portion of the data cache.

At operation 660, the processing device identifies a second exempt portion of the data cache, where the second exempt portion has the second exempt portion size and stores third data written by the host system. In an embodiment, the third data includes the relatively newer host data (e.g., the most recently written data), as compared to the data stored in the remainder of the data cache. In an embodiment, the second exempt portion correspond to the second dynamically-sized exempt portion 533B of FIG. 5.

At operation 670, the processing device identifies a second collected portion of the data cache of the memory sub-system, where the second collected portion stores fourth data written by the host system. In an embodiment, the second collected portion can be identified as the remaining portion of the data cache (i.e., the rest of the data cache, not including the second exempt portion). In an embodiment, at least a portion of the fourth data can include the first data that was exempted from the first garbage collection operation. In an embodiment, the second collected portion corresponds to the second dynamically-sized collected portion 534B of FIG. 5.

At operation 680, the processing device performs a second media management operation on the second collected portion of the data cache to relocate the fourth data to the high data density storage area, where the second exempt portion of the data cache is exempt from the second garbage collection operation. In an embodiment, the second media management operation (e.g., garbage collection operation) is the garbage collection operation performed at T2 on the second dynamically-sized collected portion 534B to relocate the second garbage collected data 550B to the XLC storage area 540 in FIG. 5.

Figure 7:
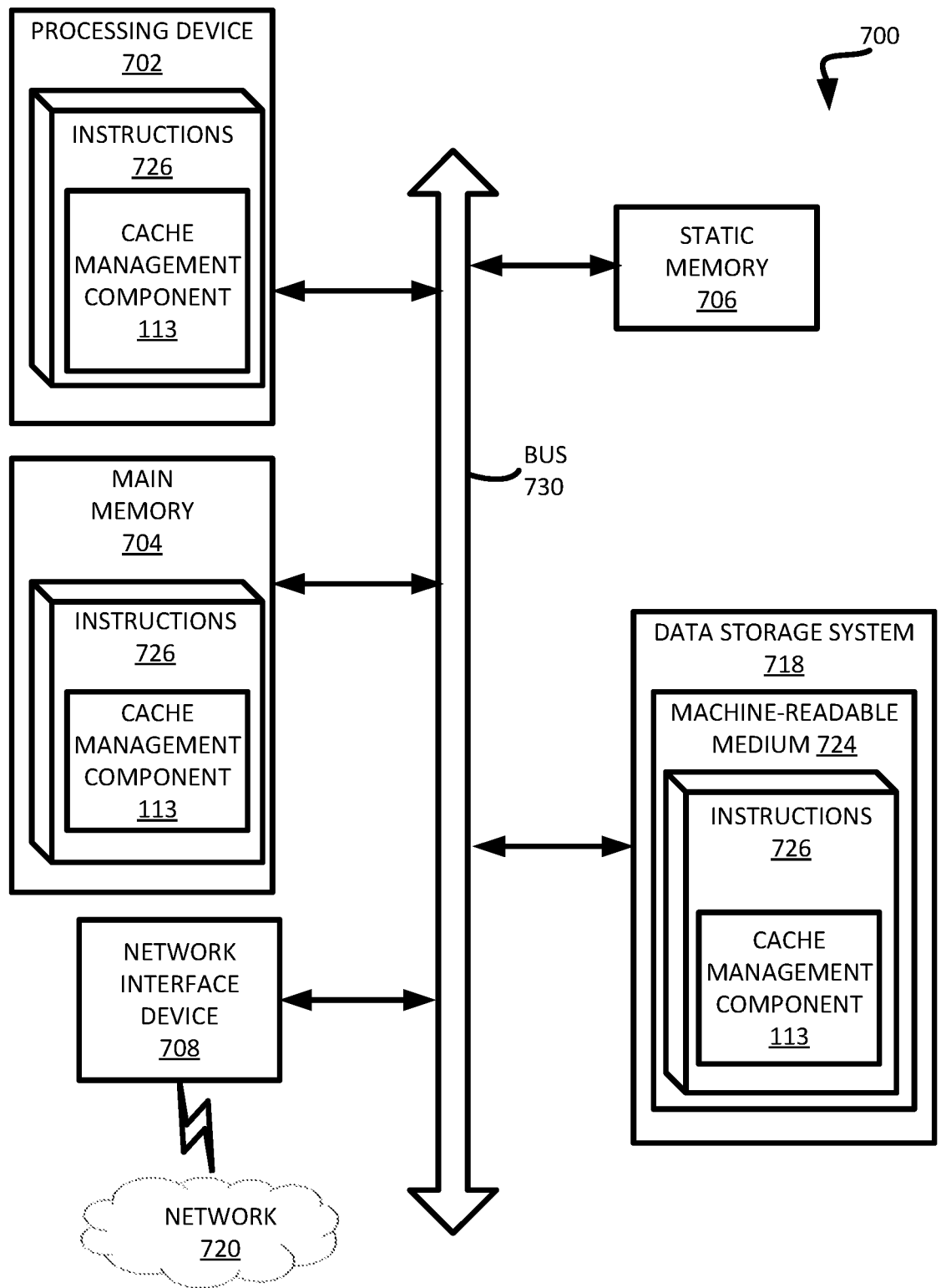
FIG. 7 is a block diagram of an example computer system in which embodiments of the present disclosure may operate.

FIG. 7 illustrates an example machine of a computer system 700 within which a set of instructions, for causing the machine to perform any one or more of the methodologies discussed herein, can be executed. In some embodiments, the computer system 700 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the cache management component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage system 718, which communicate with each other via a bus 730.

Processing device 702 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein. The computer system 700 can further include a network interface device 708 to communicate over the network 720.

The data storage system 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 can correspond to the memory sub-system 110 of FIG. 1.

In one embodiment, the instructions 726 include instructions to implement functionality corresponding to a cache management component (e.g., the cache management component 113 of FIG. 1). While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD- ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
    identifying, by a processing device, an exempt portion of a data cache of a memory sub-system, wherein the exempt portion comprises a first set of data blocks that store first data written by a host system to the data cache;
    identifying a collected portion of the data cache of the memory sub-system, wherein the collected portion comprises a second set of data blocks that store second data written by the host system;
    performing a media management operation on the collected portion of the data cache to relocate the second data to a storage area of the memory sub-system that is at a higher data density than the data cache, wherein the exempt portion of the data cache is exempt from the media management operation;
    adjusting a first size of the exempt portion based on an amount of host data written in one or more bursts between a first host idle event and a second host idle event; and
    responsive to a request to execute a write operation, reallocating the first data from the exempt portion of the data cache to a non-exempt portion of the data cache.

2. The method of claim 1, further comprising maintaining storage of the first data in the data cache following performance of the media management operation.

3. The method of claim 1, wherein the first data comprises a set of most recent data written by from the host system; and wherein the second data comprises data that is older than the first data.

4. The method of claim 1, wherein the media management operation is performed in response to identifying an idle event associated with the host system.

5. A system comprising:
    a memory component; and
    a processing device operatively coupled to the memory component, the processing device to:
        determine, based on one or more first workload metrics associated with a host system, a first exempt portion size of a data cache of a memory sub-system;
        identify a first exempt portion of the data cache based on the first exempt portion size, wherein the first exempt portion includes a first set of data blocks storing first data written to the data cache by the host system;
        identify a first collected portion of the data cache of the memory sub-system, wherein the first collected portion stores second data written by the host system;
        perform a first garbage collection operation on the first collected portion of the data cache to relocate the second data to a storage area of the memory sub-system that is at a higher data density than the data cache, wherein the first exempt portion of the data cache is exempt from the first garbage collection operation;
        adjust the first exempt portion size based on an amount of host data written in one or more bursts between a first host idle event and a second host idle event; and
        responsive to a request to execute a write operation, reallocate the first set of data blocks of the first exempt portion of the data cache to a different portion of the data cache that is subject to a second garbage collection operation.

6. The system of claim 5, wherein at least one of the one or more first workload metrics comprise a host burst size associated with the host system, an amount of valid data relocated into the storage area, or an amount of host data written to the storage area.

7. The system of claim 5, wherein the data cache comprises single level cells and the storage area comprises one of multi-level cells, triple level cells, or quad-level cells.

8. The system of claim 5, wherein the processing device is to:
    identify a first idle event associated with the host system, wherein the first garbage collection operation is performed in response to the first idle event.

9. The system of claim 5, wherein the processing device is to:
    identify a second exempt portion of the data cache, wherein the second exempt portion is based on a second exempt portion size and stores third data written by the host system; and
    identify a second collected portion of the data cache of the memory sub-system, wherein the second collected portion stores fourth data written by the host system.

10. The system of claim 9, wherein the first exempt portion size and the second exempt portion size are different values.

11. The system of claim 9, wherein the processing device is to:
    perform the second garbage collection operation on the second collected portion of the data cache to relocate the fourth data to the storage area, wherein the second exempt portion of the data cache is exempt from the second garbage collection operation.

12. The system of claim 11, wherein the processing device is to:
identify a second idle event associated with the host system, wherein the second garbage collection operation is performed in response to the second idle event.

13. A non-transitory computer-readable medium storing instructions that, when executed, cause a processing device to:
identify an exempt portion of a data cache of a memory sub-system, wherein the exempt portion comprises a first set of data blocks comprising first data written by a host system to the data cache;
identify a collected portion of the data cache of the memory sub-system, wherein the collected portion comprises a second set of data blocks comprising second data written by the host system;
perform a garbage collection operation on the collected portion of the data cache to relocate the second data to a storage area of the memory sub-system that is at a higher data density than the data cache, wherein the exempt portion of the data cache is exempt from the garbage collection operation;
adjust a first size of the exempt portion based on an amount of host data written in one or more bursts between a first host idle event and a second host idle event; and
responsive to a request to execute a write operation, reallocate the first data from the exempt portion of the data cache to a non-exempt portion of the data cache.

14. The non-transitory computer-readable medium of claim 13, the processing device is further to maintain storage of the first data in the data cache following performance of the garbage collection operation.

15. The non-transitory computer-readable medium of claim 13, wherein a first size of the exempt portion is adjusted following performance of the garbage collection operation.

16. The non-transitory computer-readable medium of claim 13, wherein the first data comprises a set of most recent data written by from the host system; and
wherein the second data comprises data that is older than the first data.

17. The non-transitory computer-readable medium of claim 13, wherein the garbage collection operation is performed in response to identifying an idle event associated with the host system.

* * * * *